(No Model.)

E. WESTON.
ELECTRICAL MEASURING INSTRUMENT.

No. 403,311. Patented May 14, 1889.

WITNESSES:
Gustave Dieterich
M. Bosch

INVENTOR,
Edward Weston
BY Park Benjamin
his ATTORNEYS.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 403,311, dated May 14, 1889.

Application filed February 28, 1889. Serial No. 301,500. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an instrument of any character or form for measuring electricity wherein an index-scale is employed, as for showing the deflections of an index or pointer; and my invention consists in combining with any form of index or pointer two scales in proximity to and indicating the extent of movement of said body, the said scales being similarly and uniformly divided, and corresponding divisions on said scales being marked and representing on one scale a unit or number of units and on the other scale a certain fraction of said unit or number of units.

Figure 1:
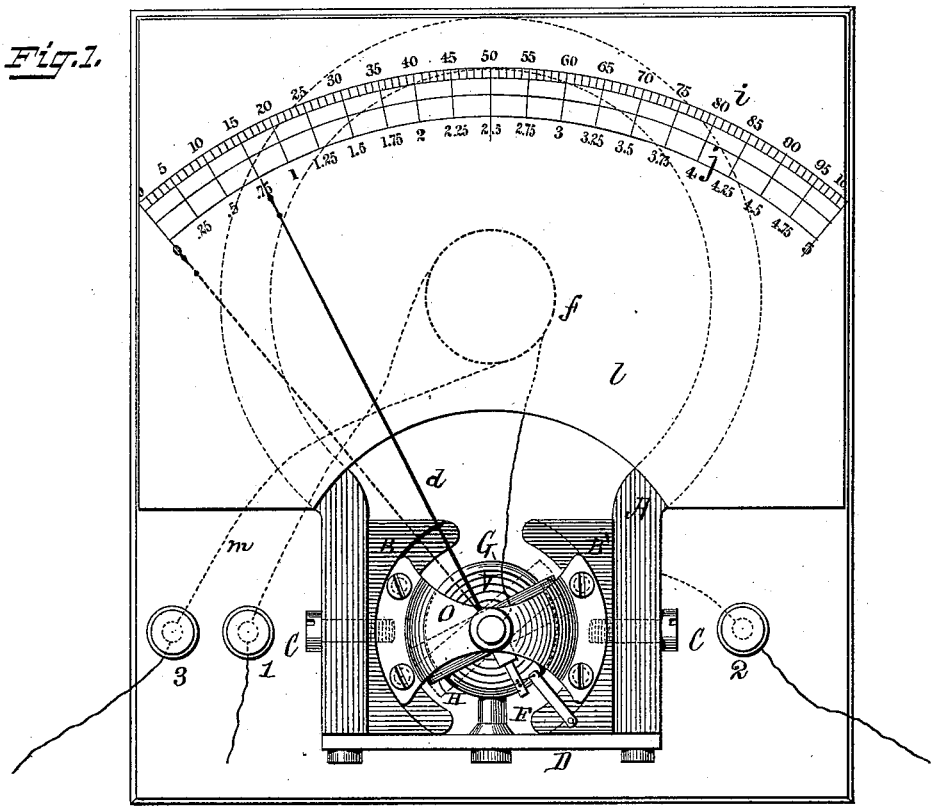
Figure 2:
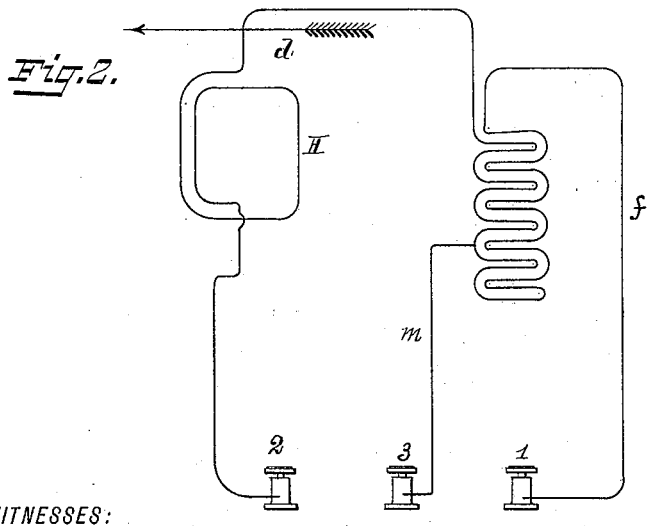

In the accompanying drawings, Figure 1 represents a voltmeter constructed substantially as shown and described in Letters Patent No. 392,387, granted to me on the 6th day of November, 1888. Fig. 2 is a diagram showing in skeleton the lead of the circuits in the instrument.

Similar letters of reference indicate like parts.

A is a permanent magnet having a circular body and polar extremities with their inner faces relatively flat and parallel.

B B' are pole-pieces attached to said faces by screws C.

D is a bar of brass secured to and extending across the ends of said magnet.

G is a solid cylinder of iron supported in the space between the pole-pieces B B' by the rod F, which is fastened to the bar D.

H is a hollow coil of insulated wire supported upon a suitable frame and pivoted in metal plates or bridges, one of which is shown at O. Said bridges are secured to the pole-pieces. Coiled springs, one of which is shown at V, are connected to the pivots of the coil and to fixed abutments, and operate to resist the rotary movement of the coil on its pivots when said coil turns in one direction.

To one of the coil-pivots is secured a light needle, $d$, which extends over a plate, $l$, upon which are inscribed two scales, $i\ j$. Scale $i$ is laid off in regular divisions from 0 to 100. Scale $j$ is precisely equal in length to scale $i$, is adjacent thereto, and is laid off in regular fractional divisions from 0 to 5. The said scales are disposed upon the arc of a circle of which the needle $d$ is a radius, so that said needle end in moving sweeps simultaneously over both scales.

In the case of the instrument is a resistance-coil, $f$, reversely wound in the usual way. The circuit in the instrument, as indicated in Fig. 2, is from binding-post 1, through the resistance-coil $f$, to and through the rotary coil H, and to the binding-post 2. When the current traverses said coil H, said coil will move on its axis and tend to take that position which will enable it to include the greatest number of lines of force traversing the space between the magnet-poles, or, in other words, the coil will act as if it were itself a magnet.

The magnitude of the moving force acting upon the coil will be proportional to the current strength; but the movement of the coil will be resisted by the resiliency of the coiled springs V; hence the extent of movement of the coil will measure the current strength, because the coil will come to rest at a point where the resistance of the spring and the moving force of the current balance; and this extent of movement is shown by the traverse of the needle $d$, attached to the coil-pivot, over the scales; and, furthermore, said scales are divided into regular intervals, because, as already stated, for twice the current strength the coil will move over double the distance, and so on proportionately.

The resistance $f$ is made very large in proportion to the internal resistance of the dynamo or battery, for example, the current-pressure of which is to be measured. The strength of the current which will reach the coil H will then depend only on the difference of potential existing between the ends of the resistance-coil. Consequently the coil H will move and the needle $d$ will swing over distances on its scale exactly proportional to the electro-motive force of the current traversing said coil, or, in other words, and to illustrate, if a current having an electro-motive force of one hundred volts after traversing a certain resistance is of sufficient strength just to move the index-needle over its entire path, then a current of one volt, the resistance remaining the same, will be indicated by the needle coming to rest after traversing the one one-hundredth part of its path. The scale $i$ in the instrument illustrated in Fig. 1 is therefore divided into one hundred equal divisions, and current-pressures of from one to one hundred volts may be measured thereon; but by varying the interposed resistance I may vary the current strength, and consequently the extent of swing of the needle corresponding to a given electro-motive force. Suppose, for example, that the resistance-coil $f$ has a resistance of one thousand ohms, and the deflection of the needle with a given current represents, for example, an electro-motive force of one hundred volts. If this resistance were reduced to fifty ohms, then the same current would cause a like deflection of the needle with an electro-motive force of but five volts. Consequently in one and the same instrument I may, for example, produce a deflection equal to the entire swing of the needle corresponding to a pressure of either one hundred or five volts. The scale $i$, as already described, is marked for volts up to 100. The scale $j$ is marked for volts and fractions of volts up to 5; hence it becomes possible, by means of scale $j$ to measure currents of low pressure with great accuracy, because, for example, the unit-division in scale $j$ is one-twentieth of a volt, and the deflection due to this on scale $j$ is fully as great as that due to a pressure of one volt on scale $i$.

In order conveniently to reduce the resistance offered by coil $f$, I attach to said coil a wire, $m$, leading to a binding-post, 3, so that by making connection to the instrument at the posts 2 and 3, instead of at posts 1 and 2, the current will traverse only a known fraction of the whole coil $f$.

The resistance of the part of the coil traversed may be but fifty ohms, while that of the whole coil may be one thousand ohms, as assumed above, or the part of the coil may bear any desired relation to the whole.

I do not, of course, limit myself to a resistance-coil thus arranged, so as to effect a cutting out of a part of it, because, obviously, I may employ two separate resistance-coils of different resistances, one in circuit with post 1, the other with post 3.

The details of construction and mode of operation of the instrument herein illustrated, wherein my present invention is here embodied, are fully set forth in my aforesaid Letters Patent, to which reference is hereby made.

I claim—

1. In an electrical measuring-instrument, a moving index or pointer and two scales in proximity to and indicating the extent of movement of said pointer, the said scales being similarly and uniformly divided, and corresponding divisions on said scales being marked, and representing on one scale a unit or number of units and on the other scale a certain fraction of said unit or number of units, substantially as described.

2. In an electrical measuring-instrument, a moving index or pointer and two parallel scales in juxtaposition in proximity to said pointer and indicating the extent of movement of said pointer, the said scales being similarly and uniformly divided, and corresponding divisions on said scales being marked, and representing on one scale a unit or number of units and on the other scale a certain fraction of said unit or number of units, substantially as described.

3. A magnet, an electrical conductor in coil or loop form supported and vibrating in the field of force of said magnet, a resilient body interposed between said coil and an abutment, a pointer or index connected to and moved by said coil, two bodies of relatively different electrical resistances in branch circuit with said coil, and two scales disposed in proximity to said pointer for indicating the extent of movement thereof, the said scales being similarly and uniformly divided, and corresponding divisions on said scales being marked, and representing on one scale a unit or number of units and on the other scale a certain fraction of said unit or number of units, substantially as described.

EDWARD WESTON.

Witnesses:
PARK BENJAMIN,
M. BOSCH.